US005937221A

United States Patent [19]

Yamamoto et al.

[11] Patent Number: 5,937,221

[45] Date of Patent: Aug. 10, 1999

[54] ELECTRO-DEVELOPING TYPE CAMERA

[75] Inventors: Yasuhiro Yamamoto; Koichi Sato, both of Tokyo, Japan

[73] Assignee: Asahi Kogaku Kogyo Kabushiki Kaisha, Tokyo, Japan

[21] Appl. No.: 08/829,178

[22] Filed: Mar. 31, 1997

[30] Foreign Application Priority Data

Mar. 29, 1996 [JP] Japan .................................... 8-104339

[51] Int. Cl.[6] ..................................................... G03B 17/48

[52] U.S. Cl. ........................... 396/429; 396/225; 348/366

[58] Field of Search ............................. 396/30, 429, 225, 396/231; 348/336, 337, 339, 366; 358/515, 516, 518

[56] References Cited

U.S. PATENT DOCUMENTS

| | | | |
|---|---|---|---|
| 4,945,423 | 7/1990 | Takanashi et al. | 358/300 |
| 5,315,410 | 5/1994 | Takanishi et al. | 358/471 |
| 5,424,156 | 6/1995 | Aoki et al. . | |
| 5,555,205 | 9/1996 | Okabe | 365/108 |
| 5,646,927 | 7/1997 | Shimizu et al. | 369/99 |

FOREIGN PATENT DOCUMENTS 5-2280 1/1993 Japan .

*Primary Examiner*—Safet Metjahic
*Assistant Examiner*—John Chizmar
*Attorney, Agent, or Firm*—Greenblum & Bernstein P.L.C.

[57] ABSTRACT

An electro-developing recording medium has a plurality of recording areas for recording R, G and B color images. The exposure operation is performed so that the aperture value and the basic exposure time are determined. The R/G signal and the B/G signal outputted from the white balance sensor are read. The basic exposure time is adjusted in accordance with the R/G signal and B/G signal, so that the actual exposure times regarding the R and B images are calculated. When the shortest exposure time of the actual exposure times corresponding to R, G, and B images is shorter than a limit value, a warning sound may be outputted by a buzzer. Further, the aperture value may be increased by an amount corresponding to, for example, 0.5 Ev. In accordance with the increased aperture value, the exposure time is recalculated.

13 Claims, 8 Drawing Sheets

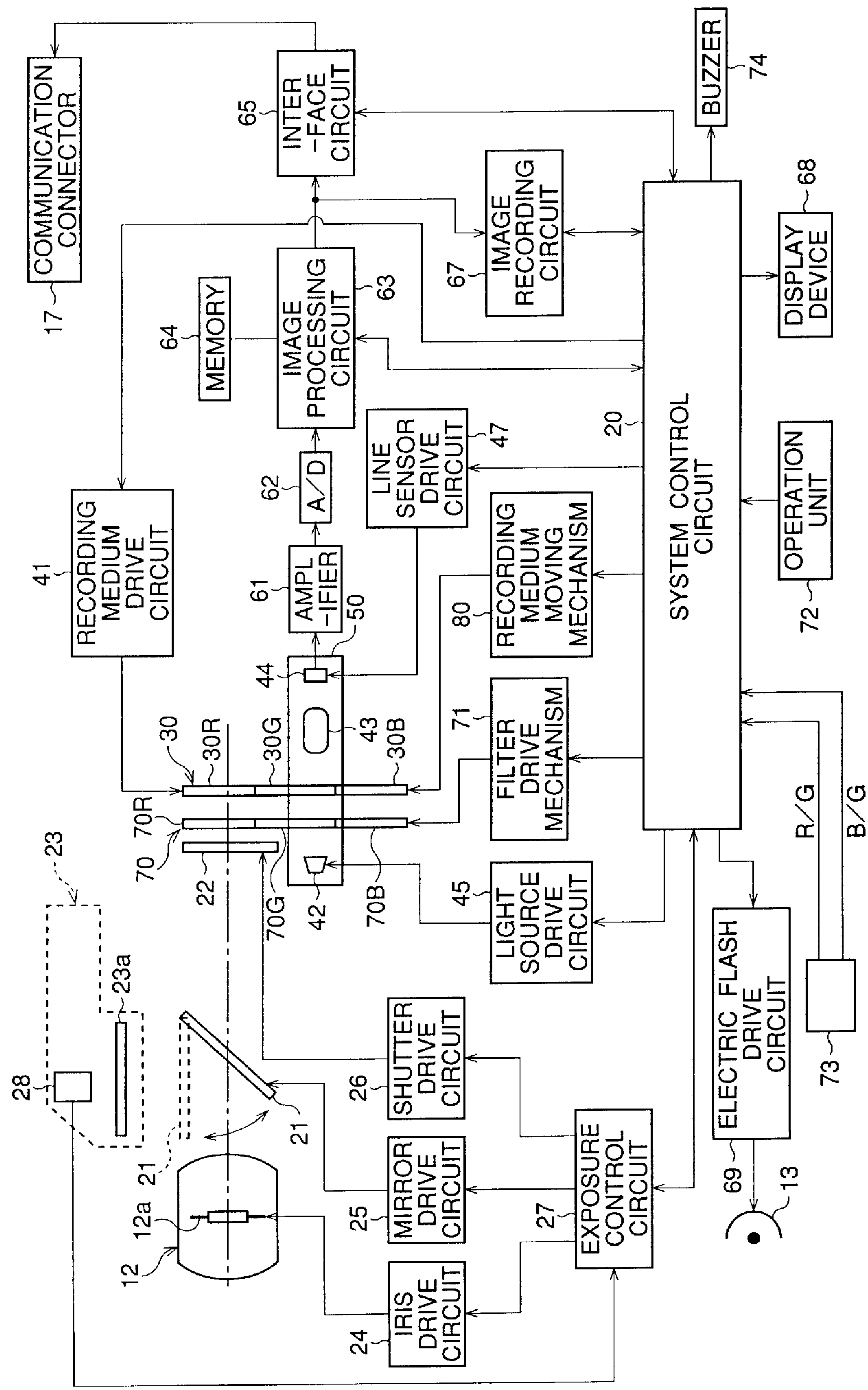
FIG. 2
COMMUNICATION CONNECTOR
INTER-FACE CIRCUIT
BUZZER
IMAGE RECORDING CIRCUIT
MEMORY
IMAGE PROCESSING CIRCUIT
DISPLAY DEVICE
LINE SENSOR DRIVE CIRCUIT
A/D
AMPL-IFIER
RECORDING MEDIUM DRIVE CIRCUIT
RECORDING MEDIUM MOVING MECHANISM
SYSTEM CONTROL CIRCUIT
OPERATION UNIT
FILTER DRIVE MECHANISM
LIGHT SOURCE DRIVE CIRCUIT
R/G
B/G
ELECTRIC FLASH DRIVE CIRCUIT
SHUTTER DRIVE CIRCUIT
MIRROR DRIVE CIRCUIT
EXPOSURE CONTROL CIRCUIT
IRIS DRIVE CIRCUIT

ELECTRO-DEVELOPING TYPE CAMERA

BACKGROUND OF THE INVENTION

1. Field of the Invention

The present invention relates to a camera using a recording medium in which an object image is electronically developed.

2. Description of the Related Art

Conventionally, as disclosed in Japanese Unexamined Patent Publication No. 5-2280 and U.S. Pat. No. 5,424,156, there is suggested a photographic material which is directly and electronically developed so that the developed visible image can be immediately obtained. In this specification, such a recording medium that is electronically developed is referred to as an electro-developing recording material, and an electronic still camera using the electro-developing recording medium is referred to as an electro-developing type camera.

A color image using the electro-developing recording medium can be obtained by structuring the camera so that the three primary colors, R (red), G (green), and B (blue) are recorded in the electro-developing recording medium, for example. Further, to reproduce a naturally colored image, it is necessary to adjust the white balance in accordance with the color temperature of the surroundings of an object while photographing, or it is necessary to adjust white balance while reading R, G, and B images and displaying the image of the object on a monitor, or so on.

However, if a separate and exclusive circuit for the white balance adjusting is provided in the camera, a problem arises in that the circuit structure of the camera is complicated and large.

SUMMARY OF THE INVENTION

Therefore, an object of the present invention is to provide an electro-developing type camera which can adjust the white balance without the introduction of a separate and large circuit.

According to the present invention, there is provided an electro-developing type camera using an electro-developing recording medium in which an object image formed by photographing lenses is electronically developed and which has a plurality of recording areas in which a plurality of color images are respectively recorded. The electro-developing type camera comprises a photometry sensor that senses an object brightness, an exposure mechanism that exposes the object image on each of the recording areas of the electro-developing recording medium, a color temperature sensor that measures a color temperature of ambient light of the object, a first calculating processor calculates a basic exposure time in accordance with the result of sensing by the photometry sensor, a second calculating processor calculates an actual exposure time of each of the recording areas in accordance with the basic exposure time and the color temperature, and a controller that performs an exposure operation on each of the recording areas by operating the exposure mechanism in accordance with the actual exposure time calculated by the second calculating processor. The controller may include a time extender in which the basic exposure time is extended when the shortest exposure time of the actual exposure times of the recording areas obtained by the second calculating processor is shorter than a limit value. The limit value is an exposure time corresponding to the highest shutter speed of the shutter which is mounted in the electro-developing type camera. The actual exposure times are set in such a manner that the ratio of the actual exposure times to the basic exposure time corresponds to the color temperature, so that the white balance adjustment is carried out. The electro-developing type camera may further comprise an outputting mechanism that warns that the shortest exposure time is shorter than the limit value. The electro-developing type camera may also further comprise an aperture controller drive an aperture of the photographing lenses. The first calculating processor calculates an aperture value corresponding to the basic exposure time. The controller changes the aperture value in accordance with extension of the basic exposure time, and the aperture controller drives the aperture in accordance with the aperture value changed by the controller. The controller uniformly changes the aperture value regarding each of the plurality of recording areas. The electro-developing type camera may further comprise a sensitivity adjuster that adjusts a photosensitivity of the electro-developing recording medium, the controller making the sensitivity adjuster adjust the photosensitivity in accordance with the extension of the basic exposure time. The sensitivity adjuster uniformly makes the photosensitivity regarding each of the plurality of recording areas lower. The exposure mechanism comprises a shutter which is provided on a side of a light receiving surface of the electro-developing recording medium, and which opens and closes an open portion corresponding to each of the recording areas, and a feeder which supplies the electro-developing recording medium so that each of the recording areas faces to the shutter. The electro-developing recording medium has recording areas of three color components corresponding to red, green and blue color respectively. The second calculating processor has a memory in which normalization coefficients are stored and respectively calculates the actual exposure time of each of the recording areas of three color components corresponding to red, green and blue color. The second calculating processor divides the basic exposure time by normalization coefficients which are set so that the actual exposure time of the recording area of red is longer and the actual exposure time of the recording area of blue is shorter while the color temperature is higher, and the actual exposure time of the recording area of red is shorter and the actual exposure time of the recording area of blue is longer while the color temperature is lower, so that each of the actual exposure times is calculated. The actual exposure time of the recording area of the color component corresponding to green is the basic exposure time.

BRIEF DESCRIPTION OF THE DRAWINGS

The present invention will be better understood from the description of the preferred embodiments of the invention set forth below, together with the accompanying drawings, in which:

FIG. 2 is a block diagram of the electro-developing type camera shown in FIG. 1;

DESCRIPTION OF THE PREFERRED EMBODIMENTS

Figure 1:
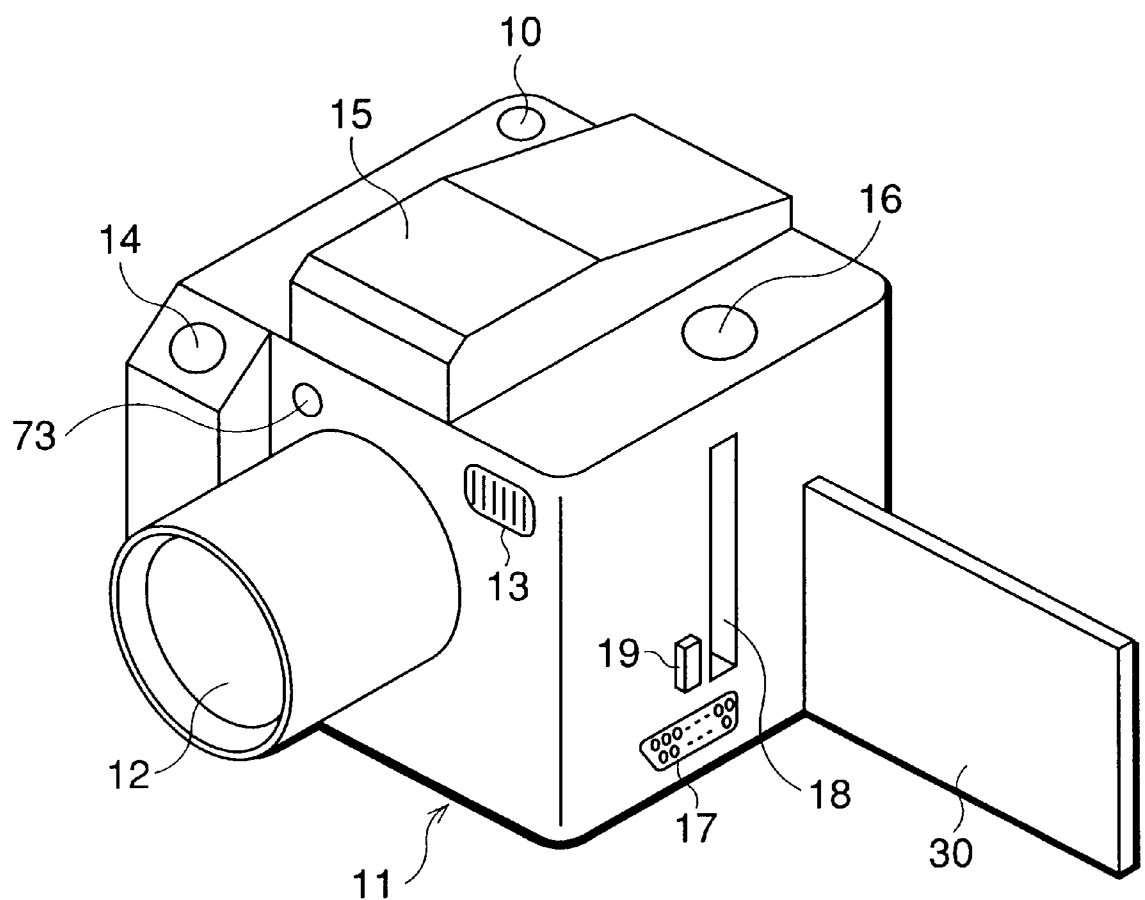
FIG. 1 is an external view showing an electro-developing type camera to which a first embodiment of the present invention is applied.

The present invention will now be described with reference to embodiments shown in the drawings.

FIG. 1 is an external view of an electro-developing type camera to which a first embodiment according to the present invention is applied.

When viewing a camera body 11 from the front side, a photographing optical system 12 including a photographing lens system and so on is provided approximately at a center portion of the front surface of the camera body 11, and an electronic flash 13 is disposed thereon to the right of and above the photographing optical system 12. A release switch 14 and a white balance sensor 73 are provided on the side opposite to the electronic flash 13.

On the upper surface of the camera body 11, a view finder 15 is provided at a center portion thereof and is extended from the front end to the rear end of the camera body 11. A main switch 10 which supplies power is provided on the side surface of the view finder 15 and on the upper surface of the camera body 11. A scanning start switch 16, for starting reading an object developed on an electro-developing recording medium 30, is provided on the upper surface of the camera body 11 and on the opposite side to the main switch 10 with the view finder 15 therebetween. A communication connector 17 is formed on a lower portion of a side surface of the camera body 11, so that an image signal obtained by this camera can be outputted to an external recording device (not shown) and so on. A slot 18 is formed on the side surface so that the electro-developing recording medium 30 can be inserted into the camera body 11. An eject button 19 is formed adjacent to the slot 18, so that the electro-developing recording medium 30 can be ejected from the camera body 11.

FIG. 2 is a block diagram of the electro-developing type camera, in which a system control circuit 20 including a microcomputer is mounted to control the electro-developing type camera as a whole.

The photographing optical system 12 has a plurality of lens groups and an aperture 12*a*. The electro-developing recording medium 30 is disposed behind the photographing optical system 12. A color filter (i.e., dichroic filter) 70 is provided in front of the electro-developing recording medium 30. A quick return mirror 21 is placed between the photographing optical system 12 and the color filter 70. A shutter 22 is provided between the quick return mirror 21 and the color filter 70. A focusing glass 23*a* included in a view-finder optical system 23 is disposed above the quick return mirror 21. A photometry sensor 28 is disposed in the view-finder optical system 23 to sense the brightness of a light beam from the photographing optical system 12.

The electro-developing recording medium 30 has a first, a second, and a third recording area 30R, 30G, and 30B, respectively, and each area corresponds to the size of one frame's worth of an image. The color filter 70 has a R (red) filter element 70R, an G (Green) filter element 70G, and a B (blue) filter element 70B, each having the same size as the recording areas 30R, 30G, and 30B, i.e., corresponding to one frame's worth of an image.

The aperture 12*a*, the quick return mirror 21, and the shutter 22 are driven by an iris drive circuit 24, a mirror drive circuit 25, and a shutter drive circuit 26, respectively, which are controlled by an exposure control circuit 27.

The exposure control circuit 27 is operated in accordance with a command signal outputted by the system control circuit 20. Namely, when an exposure is carried out, the degree of opening of the aperture 12*a* is adjusted by the iris drive circuit 24 under control of the exposure control circuit 27 based on an output signal of a photometry sensor 28.

The quick return mirror 21 is usually set to a down position to observe an object (an inclining position shown by the solid line in the drawing), so that a light beam passing through the photographing optical system 12 is directed to the view-finder optical system 23. When a photographing operation is carried out, the quick return mirror 21 is rotated upwards by the mirror drive circuit 25 under the control of the exposure control circuit 27 and set to an up position (a horizontal position shown by the broken line in the drawing), so that the light beam is directed to the electro-developing recording medium 30.

The shutter 22, which opens and closes an open portion corresponding to the recording areas 30R, 30G, and 30B, is usually closed. When the photographing operation is carried out, the shutter 22 is opened for a predetermined time period by the shutter drive circuit 26 under the control of the exposure control circuit 27, and thus, the light beam passing through the photographing optical system 12 enters a light receiving surface of the electro-developing recording medium 30. Further, the shutter 22 is controlled independently when a predetermined operation is performed on each of the recording areas 30R, 30G, and 30B. Namely, the exposure time in which the opening and closing operation of the shutter 22 is performed is different for the recording areas 30R, 30G, and 30B.

An electric voltage (i.e., a recording medium activating signal) is applied to the electro-developing recording medium 30 under the control of a recording medium drive circuit 41. BY exposing the electro-developing recording medium 30 while applying the voltage, an image formed by the photographing optical system 12 is developed on the electro-developing recording medium 30 as a visible image. Note that the recording medium drive circuit 41 is operated in accordance with a command signal outputted by the system control circuit 20.

A support member 50, which is fixed to a fixed frame (not shown), is provided close to the shutter 22. A light source 42 which comprises, for example, a light emitting diode (LED) and collimate lenses, a scanner optical system 43, and a line sensor 44 are supported by the support member 50. The line sensor 44 may be a one-dimensional CCD sensor of 2000 pixels, for example. The light source 42, the scanner optical system 43,. and the line sensor 44 are arranged in parallel to the optical axis of the photographing optical system 12.

The color filter 70 and the electro-developing recording medium 30 can be moved in a direction perpendicular to the optical axis of the photographing optical system 12. The color filter 70 and the electro-developing recording medium 30 are moved by a filter drive mechanism 71 and a recording medium moving mechanism 80, respectively.

In a photographing operation, the color filter 70 and the electro-developing recording medium 30 are moved as one, so that the centers of the G filter element 70R and the first recording area 30R, the centers of the R filter element 70G and the second recording area 30G, or the centers of the B filter element 70B and the third recording area 30B are positioned on the optical axis of the photographing optical system 12. Namely, R, G, and B images are recorded on the first, second, and third recording areas 30R, 30G, and 30B, respectively.

When an image recorded on the electro-developing recording medium 30 is read, the color filter 70 is fixed at a position to retreat from the support member 50, i.e., the side of the shutter 22, for example. In this state, each of the recording areas 30R, 30G, and 30B is moved between the light source 42 and the scanner optical system 43 in a direction perpendicular to the optical axis of the scanner optical system 43. Namely, the image recorded on the electro-developing recording medium 30 is illuminated by the light source 42 and formed on the light receiving surface of the line sensor 44, through an operation of the scanner optical system 43.

ON and OFF control of the light source 42 is performed by a light source drive circuit 45. Control of the reading operation of pixel signals generated in the line sensor 44 is carried out by a line sensor drive circuit 47. The circuits 45 and 47 are controlled by the system control circuit 20.

Pixel signals read out from the line sensor 44 are amplified by an amplifier 61, and converted to a digital signal by an A/D converter 62. The digital pixel signals are subjected to a shading correction, a gamma correction, and so on by an image processing circuit 63 under the control of the system control circuit 20, and then temporarily stored in a memory 64. The memory 64 includes an EEPROM in which correction data for the shading correction are stored. Note that the memory 64 may have a storage capacity equal to one horizontal scanning line outputted from the line sensor 44, or may have a storage capacity of one frame's worth of pixel signals.

The pixel signals read from the memory 64 are inputted to an interface circuit 65 through the image processing circuit 63, so that the pixel signals are subjected to a predetermined process such as a format conversion, and can then be outputted to an external computer (not shown) through the communication connector 17. The pixel signals outputted from the image process circuit 63 are subjected to a predetermined process such as an image compression and a format conversion in a recording device control circuit (not shown), so that the pixel signals can be recorded on a recording medium such as an IC memory card, for example, in an image recording device 67. The interface circuit 65 and the image recording device 67 are operated in accordance with a command signal outputted from the system control circuit 20.

An operation unit 72 including the main switch 10, the release button 14, the scan start switch 16 and so on, is connected to the system control circuit 20. A photography operation (i.e., a recording operation), in which an image is recorded on the electro-developing recording medium 30, and a reading operation, in which the image is read from the electro-developing recording medium 30, are performed by operating the operation unit 72. A display device 68 is connected to the system control circuit 20 to indicate various setting conditions of the electro-developing type camera. Further, an electric flash drive circuit 69 is connected to the system control circuit 20 to control the flash operation of the electronic flash 13. Furthermore, a white balance sensor 73, which detects the color temperature of the ambient light of the object, and a buzzer 74, which outputs a warning when the exposure time is shorter than a limit value after white balance adjustment, are connected to the system control circuit 20.

Figure 3:
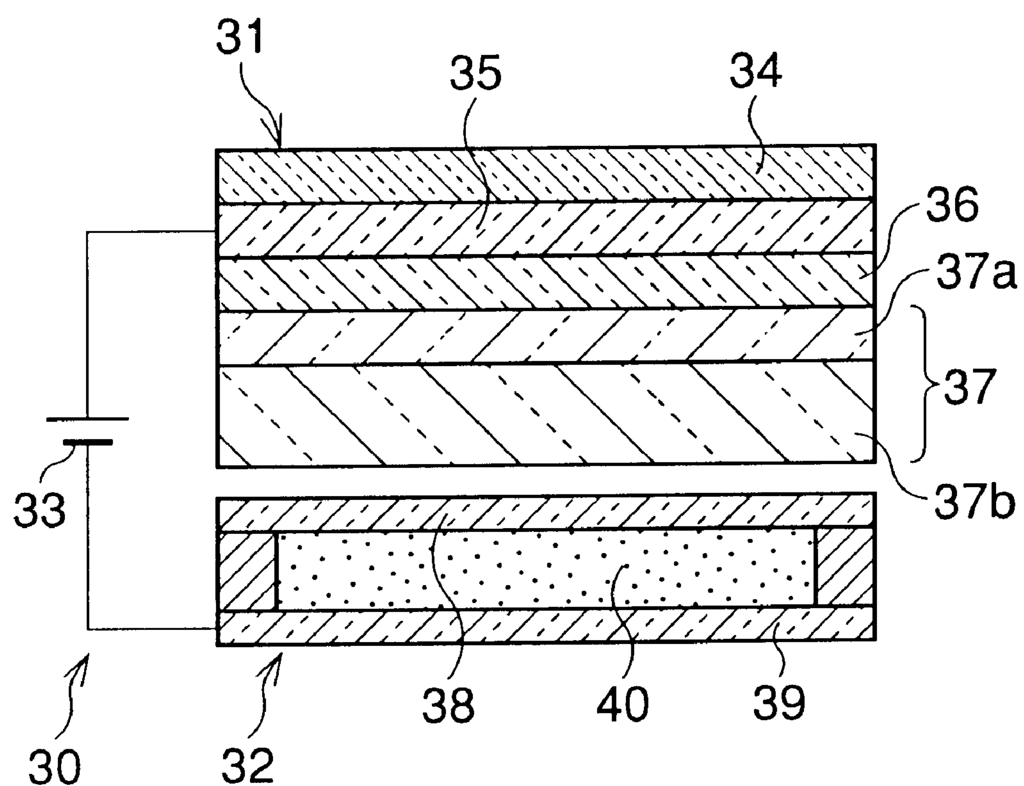
FIG. 3 is a sectional view showing an electro-developing recording medium.

FIG. 3 shows a structure of the electro-developing recording medium 30, and is the same as that shown in Japanese Unexamined Patent Publication No. 5-2280.

The electro-developing recording medium 30 has an electrostatic information recording medium 31 and an electric charge storage medium 32, and an electric voltage is applied thereto by an electric power source 33. The electrostatic information recording medium 31 is formed by laminating a glass base plate 34, an electrode layer 35, an inorganic oxide material layer 36 and a photoconducting layer 37. The photoconducting layer 37 is formed by laminating an electric charge generating layer **37*a* and an electric charge transferring layer 37*b*. The electric charge storage medium 32 is formed by confining liquid crystal 40, which is a smectic liquid crystal, between a liquid crystal supporting plate 38 and a liquid crystal electrode layer 39. The electric charge transferring layer 37*b* of the photoconducting layer 37 and the liquid crystal supporting plate 38 of the electric charge storage medium 32** face each other with a small gap therebetween.

An ON-OFF condition of the electric power source 33 is controlled by the recording medium drive circuit 41 (see FIG. 2). When the electric power source 33 is turned ON, an electric voltage is applied between the electrode layer 35 and the liquid crystal electrode layer 39, i.e., between the electrostatic information recording medium 31 and the electric charge storage medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal 40 is changed in accordance with the electric charge, the image is indicated on the liquid crystal 40 as a visible image, and thus, an image of an object is developed. Namely, the visible image is generated in accordance with the electric charge.

The electric charge storage medium 32 is a liquid crystal display having a memory-type liquid crystal such as a smectic liquid crystal, and thus, the developed visible image is kept therein even if the electric field is removed. In the liquid crystal, the developed visible image can be deleted by heating the liquid crystal, using a heating device (not shown) to a predetermined temperature. In such a case, the same electric charge storage medium 32 can be used repeatedly.

Figure 4A:
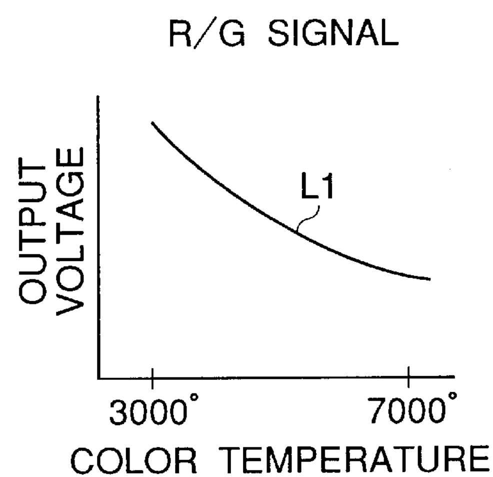
FIGS. 4A and 4B are graphs showing output characteristics of a white balance sensor.
Figure 4B:
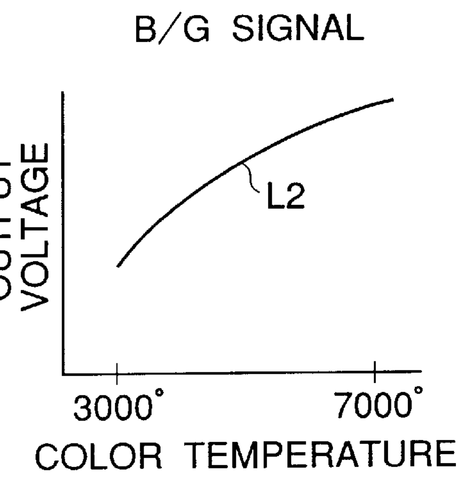
Figure 5A:
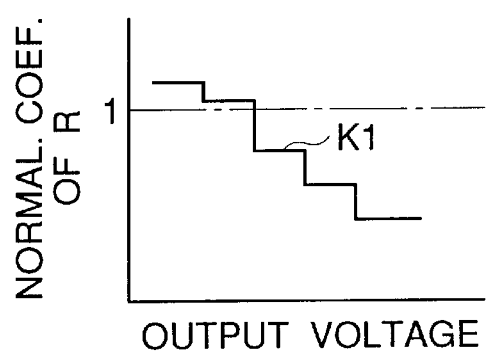
FIG. 5A is a graph showing a relationship between the output characteristics and the normalization coefficient corresponding to the color temperature information regarding a second recording area.
Figure 5B:
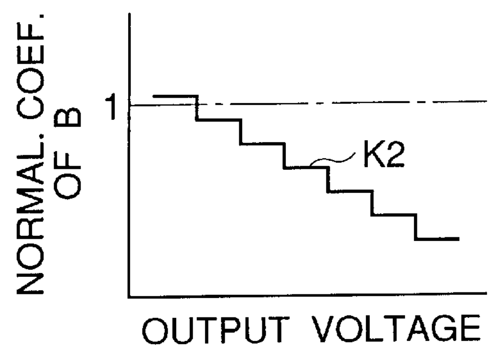
FIG. 5B is a graph showing a relationship between the output characteristics and the normalization coefficient corresponding to the color temperature information regarding a third recording area.

FIGS. 4A and 4B show output characteristics of the white balance sensor 73. FIG. 5A shows the relationship between the output characteristics and the normalization coefficient corresponding to the color temperature information regarding the first recording area 30R, and FIG. 5B shows relationship between the output characteristics and the normalization coefficient corresponding to the color temperature information regarding the third recording area 30B. Note that the normalization coefficients are stored in a memory of the system control circuit 20 in a form of a table, for example.

The white balance sensor 73 outputs an R/G signal and a B/G signal which are electric voltage signals. The R/G signal indicates the ratio of an R component and a G component contained in the incident light into the white balance sensor 73, and the B/G signal indicates a ratio of a B component and the G component contained in the incident light.

The value of the R/G signal is decreased as the color temperature is raised, as shown by the line L1 in FIG. 4A. The ratio of the R component included in the ambient light of the object is decreased as the R/G signal is decreased. Therefore, the exposure time regarding the first recording area 30R in which the R image is recorded should be extended, and the normalization coefficient corresponding to R is set less than 1 as shown by the reference K1.

The value of the B/G signal is increased as the color temperature is raised, as shown by the line L2 in FIG. 4B. The ratio of the B component included in the ambient light of the object is increased as the B/G signal is increased. Therefore, the exposure time regarding the third recording area 30B in which the B image is recorded should be extended and the second normalization coefficient corresponding to B is set less than 1 as shown by the reference K2.

Figure 6:
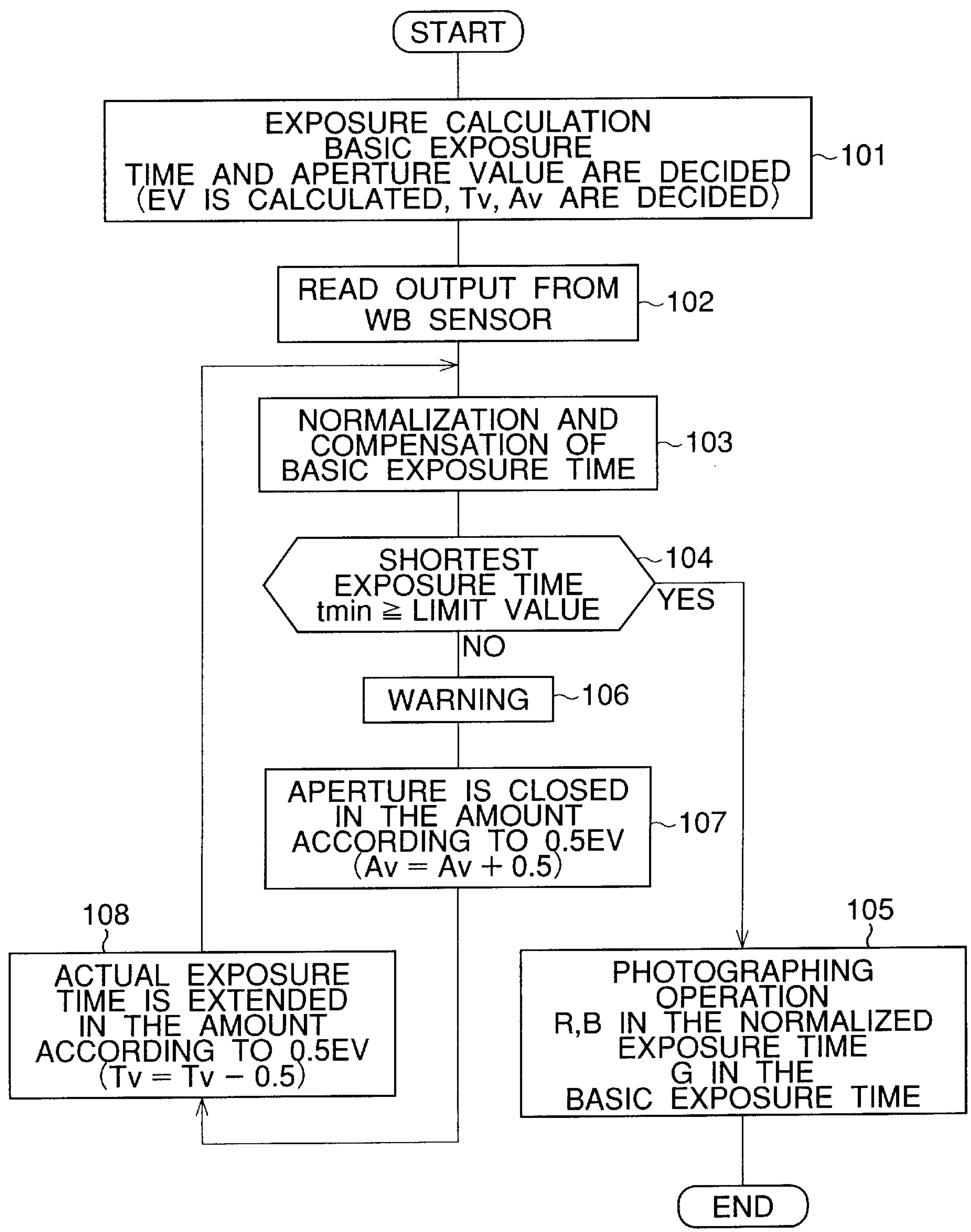
FIGS. 6 and 7 are flow charts which show a control of the exposure time.

FIG. 6 is a flow chart which shows a control of the exposure time in this embodiment.

In step 101, an exposure calculation is carried out in accordance with the output signal of the photometry sensor 28, so that an aperture value Av of the aperture 12*a* and a basic exposure time are determined. The basic exposure time is an actual exposure time regarding G image, that is the second recording area 30G. In step 102, the R/G signal and the B/G signal outputted from the white balance sensor 73 are read.

In step 103, each normalization coefficient, shown in FIG. 4, is read out from the memory in accordance with the R/G signal and the B/G signal. The basic exposure time, which is determined by the exposure calculation in step 101, is divided by each normalization coefficient so that the actual exposure times for R and B images are given. For example, when the basic exposure time is 1/1000 sec, the normalization coefficient of R is 0.8, and the normalization coefficient of B is 1.2, the actual exposure time regarding the first recording area 30R is 1/800 sec, and the actual exposure time regarding the third recording area 30B is 1/1200 sec. Thus, the actual exposure times regarding the first through third recording areas 30R, 30G, 30B are in the ratio corresponding to the color temperature of the ambient light of the object. As a result, the white balance adjustment is carried out.

In step 104, it is judged whether or not $T_{min}$, which is the shortest exposure time of the actual exposure times corresponding to the R, G and B images, is longer than a limit value which can be controlled by the shutter 22. The limit value is a value of an exposure time corresponding to the highest shutter speed of the shutter 22. When $T_{min}$ is longer than the limit value, the actual exposure times calculated in step 103 are used. Then, in step 105, the recording operation is carried out and this routine is ended. Namely, the first recording area 30R and the third recording area 30B are exposed in the exposure times normalized, and the second recording area 30G is exposed in the basic exposure time.

To the contrary, when $T_{min}$ is shorter than the limit value, in step 106 the warning sound is outputted from the buzzer 74. In step 107, the aperture value Av, which is calculated at the exposure calculation in step 101, is increased in the amount corresponding to 0.5 Ev. In step 108, a time value Tv is decreased in the amount corresponding to 0.5 Ev. Accordingly, the actual exposure time is extended. Namely, by the effect of the performance in steps 107 and 108, the result of the exposure calculation in step 101 is adjusted so that the actual exposure time is extended while the exposure value Ev is maintained. Thus, in the condition that the aperture value is lower than that calculated in step 101, the actual exposure times of each of the recording areas 30R, 30G and 30B, are calculated to be extended. In step 104, as described above, it is judged whether or not $T_{min}$ of the actual exposure time extended is shorter than the limit value, and if $T_{min}$ becomes longer than the limit value, the recording operation is performed in step 105.

In this embodiment, when the shortest one of the actual exposure times obtained by white balance adjustment is shorter than the limit value, each of the actual exposure times of the recording areas R, G and B is extended by adjusting the aperture value Av. On the other hand, the exposure values of the recording areas R, G and B still keep the ratio corresponding to the color temperature of the ambient light of the object after changing the actual exposure times. Accordingly, the image having natural color in which the white balance is adjusted is always obtained.

Figure 7:
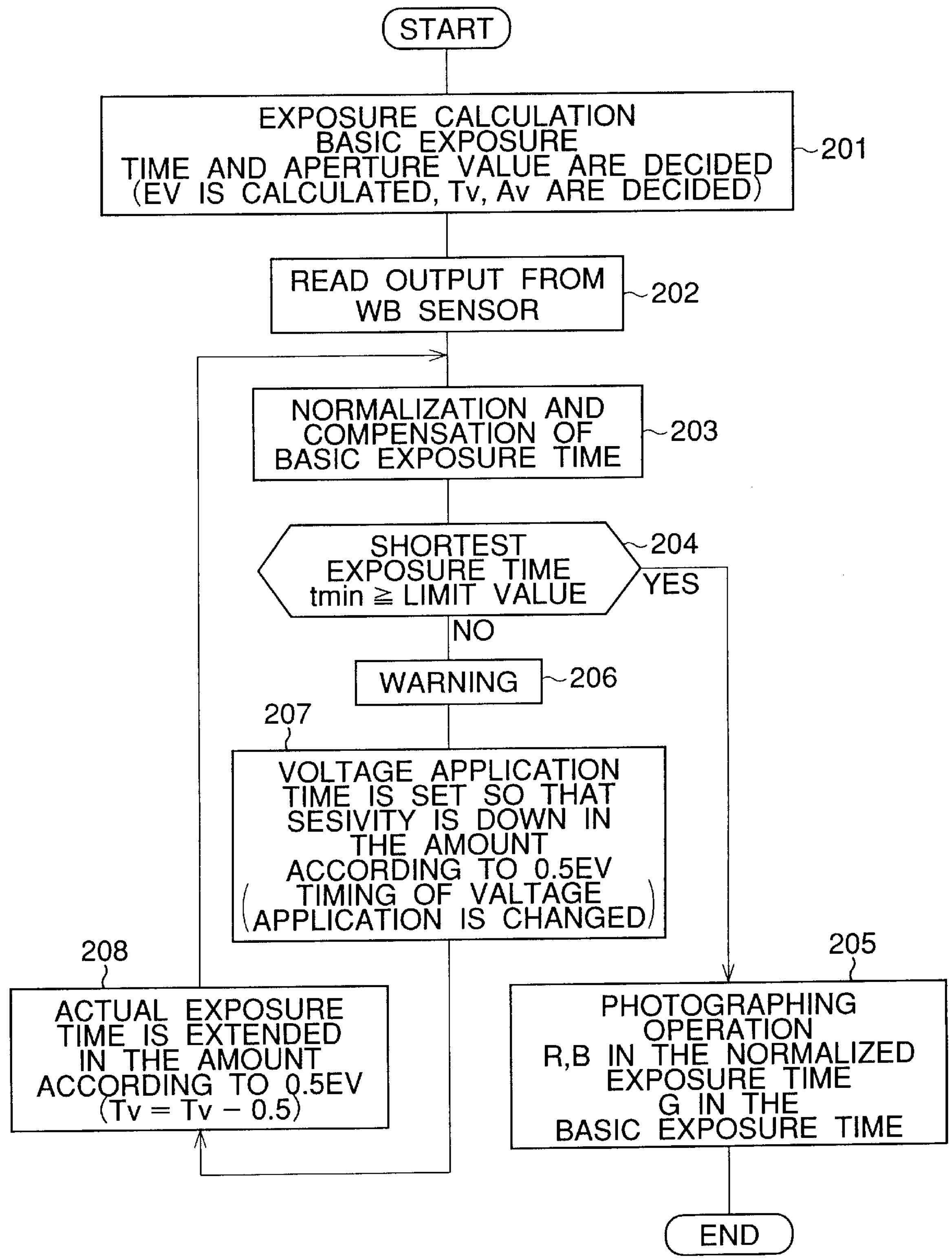

FIG. 7 is a flow chart which shows a control of the exposure time in the second embodiment. In the second embodiment, the circuit structure is similar to that of the first embodiment. Further, the effect is similar to that of the first embodiment except for step 207. Namely, the operation from step 201 to step 206 is similar to the operation from step 101 to step 106 shown in FIG. 5.

In step 207, the applied voltage time of the electro-developing recording medium 30 is arranged so that the sensitivity of the electro-developing recording medium 30 is lowered by the amount corresponding to 0.5 Ev. The sensitivity of each of the recording areas 30R, 30G and 30B is uniformly lowered. Namely, when $T_{min}$ obtained by the white balance adjustment is shorter than the limit value, the sensitivity of the electro-developing recording medium 30 is lowered and the start of the actual exposure time is delayed by the amount corresponding to the lower of the sensitivity. Further, in step 208, the time value Tv is decreased in the amount corresponding to 0.5 Ev and consequently the actual exposure time is extended. Also by the construction of this embodiment, the same effect as the first embodiment is obtained.

Next, the lower sensitivity is explained referring to FIG. 8 through FIG. 11.

Figure 8:
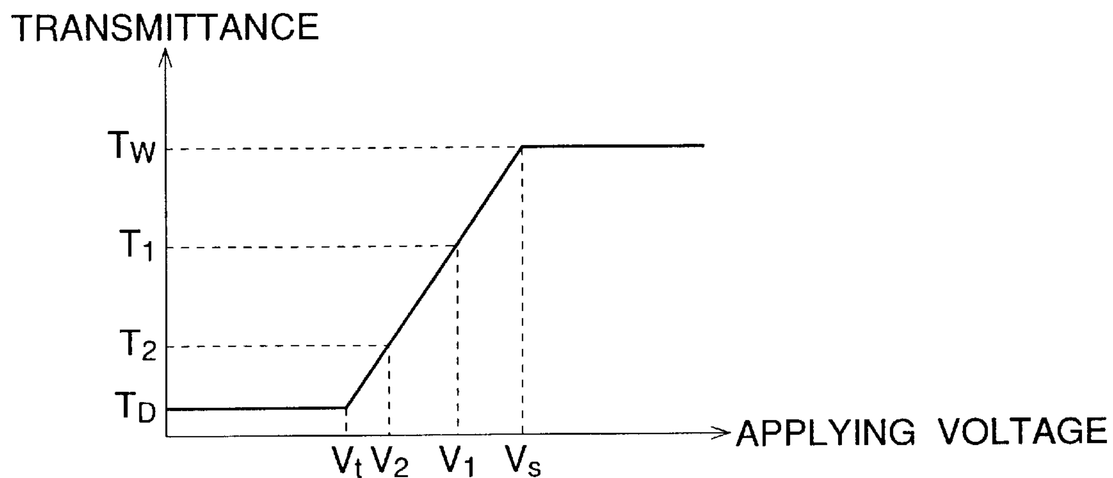
FIG. 8 shows a relationship between a voltage applied to a liquid crystal and a transmittance of a liquid crystal.

FIG. 8 shows a relationship between the voltage applied to the liquid crystal and the transmittance of the liquid crystal. When the voltage is lower than the threshold $V_t$, the transmittance shows a minimum value $T_D$, and the liquid crystal is opaque. When the voltage starts to be increased, also the transmittance starts to increase, and then, when the voltage becomes higher than the highest limit value $V_s$, the transmittance reaches the maximum value $T_w$, and the liquid crystal becomes transparent. Such a relationship, between the voltage and the transmittance, namely the ratio of the change of the transmittance to the change of the voltage is peculiar to liquid crystal.

Figure 9:
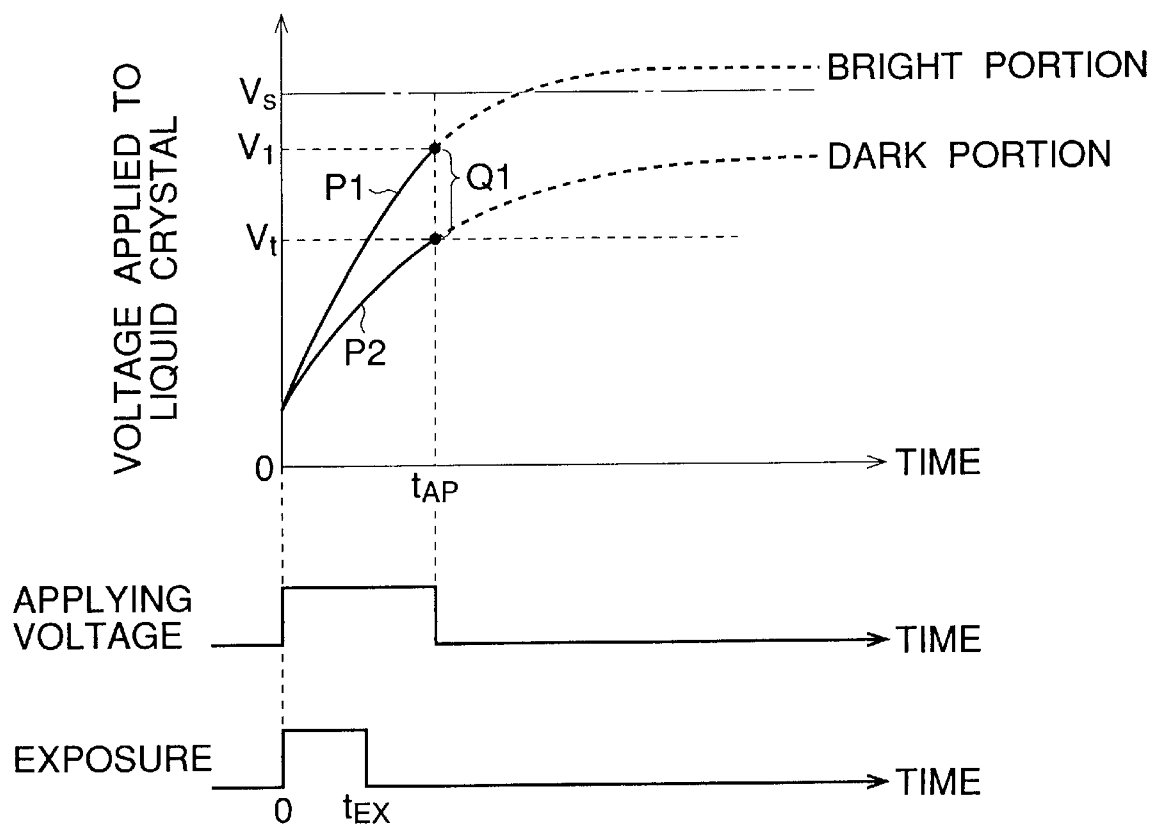
FIG. 9 shows a change of the voltage applied to the liquid crystal, when an exposure and voltage application on the electro-developing recording medium starts at once.

FIG. 9 shows the change, with the passage of time, of the voltage applied to the liquid crystal, when the exposure and the voltage application to the electro-developing recording medium are started at once, namely under the prior control. The contrast of the image developed by the liquid crystal is explained with reference to this figure. In FIG. 9, the exposure continues until the time $t_{EX}$, and the voltage application to the electro-developing recording medium is performed after the exposure ends and continues until the time $t_{AP}$.

Electric charge according to the image is generated in the electrostatic information recording medium 31 (see FIG. 3), and then the conductivity changes. The conductivity is high at the portion corresponding to the bright portion of the image. In other words, the resistance value of the electrostatic information recording medium 31 is low at the portion corresponding to the bright portion of the image. Accordingly, in the liquid crystal, the voltage becomes high relatively early at the portion corresponding to the bright portion of the image (reference P1), and the voltage becomes higher relatively late at the portion corresponding to the dark portion of the image (reference P2). Namely, the difference between the voltage of the portion corresponding to the bright portion and the voltage of the portion according to the dark portion becomes greater as time passes. If the voltage application to the electro-developing recording medium is stopped at the time $t_{AP}$ when the voltage of the dark portion reaches threshold $V_t$ (see FIG. 8), the image, which has the contrast corresponding to the difference (reference Q1) between the voltage $V_1$ of the bright portion and the voltage $V_t$ of the dark portion, is kept in the liquid crystal.

Figure 10:
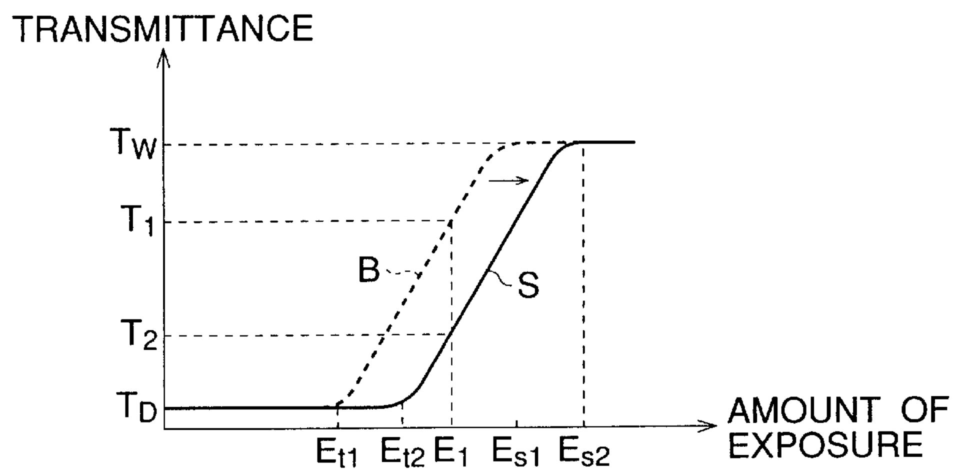
FIG. 10 shows a relationship between the amount of exposure on an electrostatic information recording medium and the transmittance of the liquid change.

FIG. 10 shows a relationship between the amount of exposure to the electrostatic information recording medium and the transmittance of the liquid crystal. The broken line B shows the relationship between the amount of exposure and the transmittance in the case which the exposure and the voltage application are started at the same time as shown in FIG. 9, and the solid line S shows the relationship between the amount of the exposure and the transmittance in the case which the exposure is started later than the voltage application is started. The amount of the exposure is equal to the product of the exposure brightness and the exposure time $t_{EX}$ (see FIG. 9). Note that, for convenience sake, the exposure time $t_{EX}$ is assumed to be invariable.

In the broken line B, the transmittance of the liquid crystal is at the minimum value $T_D$ when the amount of exposure is lower than the first threshold $E_{t1}$. The transmittance becomes higher, as the amount of exposure increases. The transmittance reaches the maximum value $T_w$ when the amount of exposure becomes higher than the first upper limit value $E_{s1}$. Namely, the liquid crystal becomes transparent and the transmittance of the liquid crystal does not change even if the amount of exposure further increases. In other words, a brighter image can not be developed. On the other hand, by lowering the sensitivity of the liquid crystal, the characteristic curve which shows the relationship between the amount of exposure and the transmittance can be shifted from the broken line B to the solid line S which is described at the right side of the broken line B. Namely, in the solid line S, the transmittance starts to rise at the second threshold $E_{t2}$, and the transmittance reaches the maximum value $T_w$ when the amount of exposure becomes higher than the second upper limit value $E_{S2}$ which is greater than the first upper limit value $E_{S1}$. For example, when the amount of exposure is $E_1$, the transmittance is $T_1$ on the characteristic curve of the broken line B, and on the other hand, the transmittance is $T_2$, which is lower than $T_1$, on the characteristic curve of the broken line S.

Figure 11:
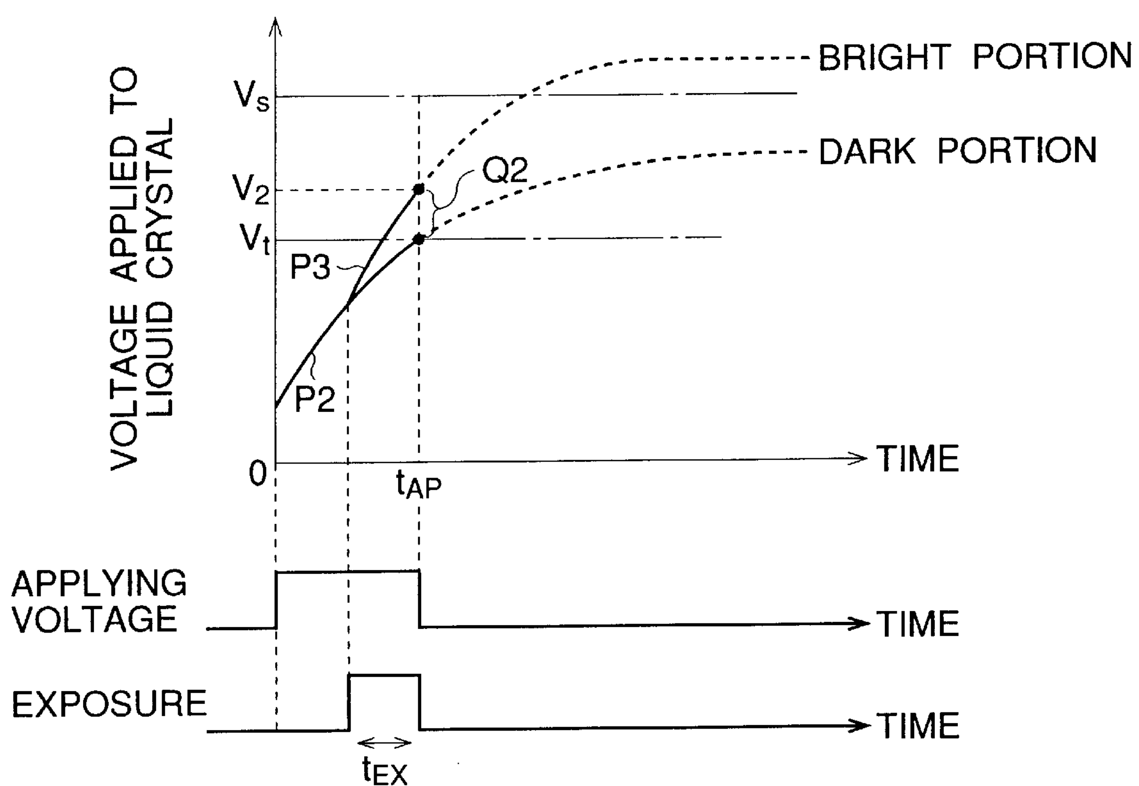
FIG. 11 shows the control by which the sensitivity of the liquid crystal is lowered.

FIG. 11 shows the control by which the sensitivity of the liquid crystal is lowered. Namely, FIG. 11 shows the change with the passing of time of the voltage of the liquid crystal similar to the description shown in FIG. 9. The voltage application time tap and the exposure time $t_{EX}$ are as long as those in FIG. 9. The timing of the exposure and the voltage application is different from those in FIG. 9. In FIG. 11, the exposure is started later than when the voltage application is started, and then it is ended at the same time as the voltage applying is ended.

In FIG. 11, at the beginning of the voltage applying to the electro-developing recording medium, since the exposure is not yet started, all portion of the image formed on the liquid crystal is dark. Thus, the voltage applied to the liquid crystal rises relatively slowly (reference P2). When the exposure is started, any bright portions are generated on the liquid crystal. At the bright portions, the voltage rises relatively fast (reference P3) similarly to FIG. 9. Accordingly, the difference of the voltage between the bright portion and the dark portion gets greater as the time passes. If the voltage application to the electro-developing recording medium is stopped at $t_{AP}$ when the voltage of the dark portion reaches the threshold $V_t$, the image which has the contrast corresponding to the difference (reference Q2) between the voltage $V_2$ of the bright portion and the voltage $V_t$ of the dark portion can be obtained. Since the exposure is started later than the voltage application is started in FIG. 11, the difference Q2 of the voltage is smaller than the difference Q1 of the voltage in FIG. 9. Accordingly, the image which has a predetermined contrast can be obtained, if the exposure is arranged to be started later than the voltage application is started and the actual exposure time and the time of the voltage application are extended.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 8-104339 (filed on Mar. 29, 1996) which is expressly incorporated herein, by reference, in its entirety.

We claim:

1. An electro-developing type camera using an electro-developing recording medium in which an object image formed by photographing lenses is electronically developed and which has a plurality of recording areas in which a plurality of color images are respectively recorded, said electro-developing type camera comprising:

- a photometry sensor that senses an object brightness;
- an exposure mechanism that exposes said object image on each of said recording areas of said electro-developing recording medium;
- a color temperature sensor that measures a color temperature of ambient light of said object;
- a first calculating processor that calculates a basic exposure time in accordance with a result of sensing by said photometry sensor;
- a second calculating processor that calculates an actual exposure time for each of said recording areas in accordance with said basic exposure time and said color temperature; and
- a controller that performs an exposure operation on each of said recording areas by operating said exposure mechanism in accordance with each of said actual exposure times calculated by said second calculating processor.

2. An electro-developing type camera according to claim 1, wherein said controller comprises a time extender in which said basic exposure time is extended when the shortest exposure time of said actual exposure times of said recording areas obtained by said second calculating processor is shorter than a limit value.

3. An electro-developing type camera according to claim 2, wherein said limit value is an exposure time corresponding to the highest shutter speed of a shutter of said eletro-developing type camera.

4. An electro-developing type camera according to claim 1, wherein said actual exposure times are set in such a manner that a ratio of each of said actual exposure times to said basic exposure time corresponds to said color temperature, so that a white balance adjustment is carried out.

5. An electro-developing type camera according to claim 2, further comprising an outputting mechanism warning said shortest exposure time is shorter than said limit value.

6. An electro-developing type camera according to claim 2, further comprising an aperture controller driving an aperture of said photographing lenses, said first calculating processor calculating an aperture value corresponding to said basic exposure time, said controller changing said aperture value in accordance with extension of said basic exposure time, and said aperture controller driving said aperture in accordance with said aperture value changed by said controller.

7. An electro-developing type camera according to claim 6, wherein said controller uniformly changes said aperture value regarding each of said plurality of recording areas.

8. An electro-developing type camera according to claim 2, further comprising a sensitivity adjuster adjusting a photosensitivity of said electro-developing recording medium, said controller making said sensitivity adjuster adjust said photosensitivity in accordance with said extension of said basic exposure time.

9. An electro-developing type camera according to claim 8, wherein said sensitivity adjuster uniformly makes said photosensitivity regarding each of said plurality of recording areas lower.

10. An electro-developing type camera according to claim 1, wherein said exposure mechanism comprising a shutter which is provided on a side of a light receiving surface of said electro-developing recording medium, and which opens and closes an open portion corresponding to each of said recording areas, and a feeder which supplies said electro-developing recording medium so that each of said recording areas faces to said shutter.

11. An electro-developing type camera according to claim 1, wherein said electro-developing recording medium has recording areas of three color components corresponding to red, green and blue color respectively, said second calculating processor has a memory in which normalization coefficients are stored and respectively calculates said actual exposure times of said recording areas of three color components corresponding to red, green and blue color.

12. An electro-developing type camera according to claim 11, wherein said second calculating processor divides said basic exposure by each of said normalization coefficients which are set so that the actual exposure time of the recording area of red is longer and the actual exposure time of the recording area of blue is shorter while said color temperature is higher, and the actual exposure time of the recording area of red is shorter and the actual exposure time of the recording area of blue is longer while said color temperature is lower, so that each of said actual exposure times is calculated.

13. An electro-developing type camera according to claim 11, wherein the actual exposure time of the recording area of the color component corresponding to green is said basic exposure time.

* * * * *